United States Patent
Iwasaki et al.

(10) Patent No.: US 6,452,971 B1
(45) Date of Patent: Sep. 17, 2002

(54) MOVING PICTURE TRANSFORMING SYSTEM

(75) Inventors: Osamu Iwasaki, Tokyo; Tsutomu Uenoyama, Kanagawa; Daisaku Komiya, Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/505,506

(22) Filed: Feb. 17, 2000

(30) Foreign Application Priority Data

Feb. 23, 1999 (JP) .......................................... 11-044381

(51) Int. Cl.[7] .............................................. H04N 7/36
(52) U.S. Cl. .................. 375/240.12; 348/699; 370/466; 375/240.26; 382/243
(58) Field of Search ........................ 375/240.12, 240.16, 375/240.26; 348/699; 370/466; 382/243; H04N 7/36

(56) References Cited

U.S. PATENT DOCUMENTS

| | | | |
|---|---|---|---|
| 5,602,589 A | * 2/1997 | Vishwanath et al. | ........ 348/398 |
| 5,940,391 A | * 8/1999 | Malkin et al. | .............. 370/466 |
| 6,058,143 A | * 5/2000 | Golin | ................... 375/240.16 |

* cited by examiner

Primary Examiner—Howard Britton
(74) Attorney, Agent, or Firm—Pearne & Gordon LLP

(57) ABSTRACT

Moving picture transforming system which executes transformation of moving picture coding scheme at high speed and with less degradation of picture quality, in that there are provided a motion compensating means 42 for compensating an image based on the motion information output from the variable length decoding means; a moving picture decoding means 120 consisting of an image memory for storing a reference image used by the motion compensating means; a motion information memory portion 20 for storing the motion information output from the moving picture decoding means; a motion prediction controlling portion 60 for outputting a candidate of the motion vector and controlling execution of the motion prediction, based on the motion information accumulated in the motion information memory portion; a motion candidate memory 53 for storing a plurality of outputs of the motion prediction controlling portion in sequence; an adaptive motion predicting means 51 for performing the motion prediction of the image output from the moving picture decoding means based on motion candidates accumulated in the motion candidate memory and the searched information accumulated in the search information memory; and a moving picture coding portion 130 for performing the coding based on them.

7 Claims, 12 Drawing Sheets

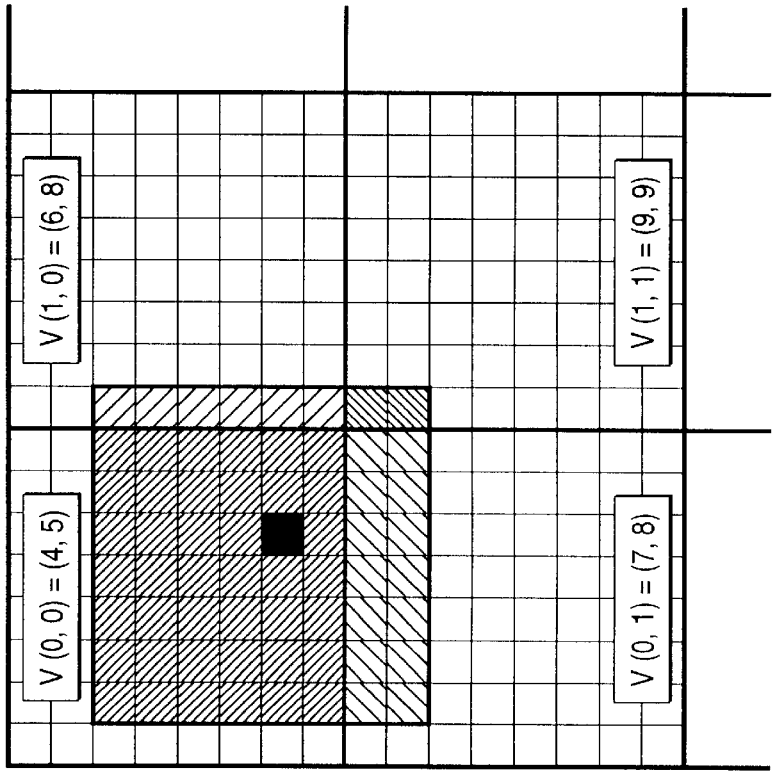

FIG. 12

AN EXAMPLE OF A SCHEME FOR CALCULATING A POSITION VECTOR AS A PIXEL UNIT BASED ON THE MOTION VECTOR AS THE IMAGE CONSTITUTING UNIT WHEN THE IMAGE CONSTITUTING UNIT CONSISTS OF (8 x 8) PIXELS

ASSUME THAT THE MOTION VECTOR AT A POSITION (5, 6) INDICATED BY ■ IN THE PIXEL UNIT IS DERIVED BY DIVIDING A TOTAL SUM, WHICH IS OBTAINED BY MULTIPLYING EACH VECTOR BY AN AREA OF EACH IMAGE CONSTITUTING UNIT OCCUPIED BY A (8 X 8) REGION WHICH HAS (5, 6) AS ITS CENTER, BY AN AREA OF THE IMAGE CONSTITUTING UNIT

THE VECTOR OF THE PIXEL COORDINATE POSITION (5, 6) IS
Vx = (4*7*6 + 6*1*6 + 7*7*2 + 9*1*2)/64
Vy = (5*7*6 + 8*1*6 + 8*7*2 + 9*1*2)/64 i,e, (5, 6.0625) AND THUS BECOMES (5, 6) AFTER ROUNDING

MOVING PICTURE TRANSFORMING SYSTEM

BACKGROUND OF THE INVENTION

The present invention relates to a moving picture transforming system for transforming a moving picture compression format and, more particularly, a moving picture transforming system which is able to reduce an amount of operation to detect motion vectors by reusing or referring to the motion vectors and thus achieve the higher-speed transformation of the moving picture and the reduction of degradation in the picture quality.

In recent years, digitization of the telecommunication technology has been proceeded. A project for digitizing the current analogue broadcasting system such as NTSC/PAL/SECAM, etc. is also in progress. In addition, as the new broadcasting service employing the digital technology, there are the satellite broadcasting which can provide the multichannel service, the ground wave broadcasting of the Hi-Vision broadcasting (ATV: Advanced Television), the video-on-demand, etc. Meanwhile, as the communication service employing the digital technology, there are the TV phone, the electronic conference system, etc.

However, as the common subject occurred in communicating such moving pictures by the digital signals, it may be considered that a great deal of information are needed. Since such digital signals are reproduced at the high frame rate in real time, the moving picture compression technology is indispensable to suppress the traffic in the network.

In order to compress effectively the moving picture data having an enormous amount of information, an approach which can reduce the redundancy by utilizing the correlation in the time-base axis or the space-base axis is employed. Although there are various compression schemes, there is the scheme using MPEG (Moving Picture Experts Group) as the typical one. This scheme has been discussed in ISO-IEC/JTC1/SC2/WG11 and then proposed as the standard scheme, and the hybrid scheme utilizing motion compensation coding, DCT (Discrete Cosine Transform) coding, and VLC (Variable Length Coding) in combination is adopted.

Further, the technology which is called the transcoding to execute the bit rate transformation under restrictions of the communication media becomes in use. However, in the future, from the viewpoint of reuse of the moving picture contents which have already accumulated and the viewpoint of mutual utilization between the TV phone/the electronic conference system which have already been spread and future mobile moving picture communication, it may be expected that great importance will be attached to the transcoding between different moving picture compression schemes.

A view of a configuration of a typical decoding device based on the MPEG is shown in FIG. 1. A view of a configuration of an encoding device based on the MPEG is shown in FIG. 2. As a typical example of the image transmission utilizing the transcoding technology, a configuration of "Transcoding Method and System" set forth in Patent Application Publication (KOKAI) Hei 8-51631 is shown in FIG. 3.

A decoder shown in FIG. 1 comprises a coding channel 12. This coding channel includes in series a variable length decoding means 1, an inverse quantizing means 2, and an inverse frequency converting means (e.g., an inverse orthogonal transforming means such as an inverse discrete cosine transforming means 3). The decoder comprises further a motion compensation stage 4 in series. This stage includes in series an image memory (MEM) 41 for receiving an output signal from the decoder, a motion compensating means 42 operated based on an output signal of the memory 41 and a (transmitted and/or accumulated) motion vector V which the decoder receives simultaneously with a coded signal, and an adder 43 for adding an output signal of the inverse discrete cosine transforming means 3 and an output signal of the motion compensating means 42. An output terminal of this adder constitutes both an output terminal of the decoder and an input terminal of the memory 41.

The encoder shown in FIG. 2 comprises a coding and decoding channel 13 and a prediction channel 10. The coding and decoding channel 13 includes in series a frequency converting means (similarly, an orthogonal transforming means such as a discrete cosine transforming means 5), a quantizing means 6, and a variable length coding means 7. Further, an inverse quantizing means 8 and an inverse frequency converting means (e.g., an inverse orthogonal transforming means such as an inverse discrete cosine transforming means 9) are provided on the output side of the quantizing means 6. In the following explanation, an output terminal of the variable length coding means 7 is called a prediction output terminal, and constitutes an input terminal of the prediction channel 10. The prediction channel 10 includes an adder 101 which reconstructs the blocks (in this example, the original video signal which corresponds to the moving picture series is divided into blocks which have the same size as the M×N pixels), an image memory 102, a motion compensating means 103 operated based on the previously estimated motion vector, and a subtracting means 11 for receiving the input signal of the encoder at its plus input terminal and receiving an output signal of the motion compensating means 103 at its minus input terminal and then coding only a difference between these signals. The adder 101 receives the output signal from the motion compensating means 103 and a prediction output signal from the coding and decoding channel 13.

The moving picture transforming system shown in FIG. 3 comprises a variable length coding channel portion 13 at a later stage of a variable length decoding channel portion 12. A prediction function portion 140 which has an image memory 41 and a motion vector compensating means 42 is connected between these two channels.

The above moving picture transforming system in the prior art intends to achieve the change (mainly the reduction since the picture quality degraded due to compression cannot be increased) of the bit rate (code capacity per unit time: represented by bit/second) of the moving picture simply and at a low cost by changing the moving picture compression degree since the motion prediction is omitted and the motion compensating means is used commonly. The above system has such disadvantages that such system cannot achieve the transformation into the different image compression scheme (especially, transformation into the scheme having the different spatial resolution or temporal resolution) and that, in the case that the spatial resolution and temporal resolution (frame rate) do not have the same format even if the system has the same spatial resolution and temporal resolution, differential image from the prediction image is increased if the motion vectors are used again as they are and thus the degradation of the picture quality is increased to convert into a certain bit rate.

SUMMARY OF THE INVENTION

It is an object of the present invention to achieve the high-speed transformation into a different moving picture compression format with less degradation in the picture quality.

In order to overcome the above subjects, first, the present invention provides a moving picture transforming system which comprises:

a moving picture decoding portion including: a variable length decoding means for receiving coded digital signals of a compressed moving picture and outputting quantized video information and motion information; an inverse quantizing means for reversing quantization of the quantized video information output from the variable length decoding means; an inverse orthogonal transforming means for inversely orthogonal-transforming an output of the inverse quantizing means; a motion compensating means for compensating an image based on the motion information output from the variable length decoding means; an image memory for storing a reference image used by the motion compensating means;

a motion information memory portion for storing the motion information output from the moving picture decoding means;

a motion prediction controlling portion for outputting a candidate of the motion vector and controlling execution of the motion prediction, based on the motion information accumulated in the motion information memory portion;

a moving picture coding portion including: a motion candidate memory for storing a plurality of outputs of the motion prediction controlling portion in sequence; a search information memory for storing searched information to avoid overlapping caused by searching a plurality of search candidates; an adaptive motion predicting means for performing the motion prediction of the image output from the moving picture decoding means based on motion candidates accumulated in the motion candidate memory and the searched information accumulated in the search information memory; an orthogonal transforming means for orthogonally transforming the image; a quantizing means for quantizing the image which is subjected to orthogonal transformation by the orthogonal transforming means; a variable length coding means for coding again the image quantized by the quantizing means to output it; a second inverse quantizing means for performing an inverse transformation against the quantizing means; a second inverse orthogonal transforming means for performing an inverse transformation against the orthogonal transforming means; a second image memory which corresponds to a resolution of the moving picture to be coded; and a motion compensating means operated in accordance with the motion information output from the adaptive motion predicting means.

Therefore, an amount of calculation necessary for the motion prediction can be reduced by utilizing effectively the motion information contained in the original moving picture code, so that the higher speed operation can be achieved and also the degradation of the picture quality can be reduced.

Second, the motion prediction controlling portion includes a motion information range limiting means which writes a position at which the motion vector crosses the search range into the motion candidate memory if the motion vector exceeds the search range when the motion information candidates are loaded into the motion information candidate memory. Therefore, a utility factor of the motion information can be improved, and an amount of calculation necessary for the motion prediction can be reduced. Also, the higher speed operation can be achieved and also the degradation of the picture quality can be reduced.

Third, the motion information memory has memories for a plurality of images, the motion prediction controlling portion synthesizes the motion information along a time base every image constituting unit having the motion information and outputs it to the motion candidate memory, and a motion information synthesizing means which outputs information indicating that the motion vector is invalid in place of the motion vector to the motion candidate memory if the frame with no motion vector is detected in motion synthesis is provided, whereby the motion vector can be referred to and utilized when one image is coded by thinning the frame from a differential image containing a plurality of successive motion vectors. Therefore, a utility factor of the motion information can be improved, and an amount of calculation necessary for the motion prediction can be reduced. Also, the higher speed operation can be achieved and also the degradation of the picture quality can be reduced.

Fourth, the motion prediction controlling portion includes a motion information spatial interpolating means which performs the interpolation by using an average of the motion vectors in neighboring image constituting units as a substitute vector when there is no motion vector in the image constituting unit accumulated in the motion information memory. Therefore, a utility factor of the motion information can be improved, and an amount of calculation necessary for the motion prediction can be reduced. Also, the higher speed operation can be achieved and also the degradation of the picture quality can be reduced.

Fifth, the motion prediction controlling portion includes an average value calculating means for calculating an average value of all vectors for one screen, a square total sum calculating means for calculating a total sum of a difference between respective vectors and the average vector, and a comparison deciding means for outputting a square total sum to the motion information candidate memory if the square total sum is less than a predetermined value by comparing an output of the square total sum calculating means with the predetermined value. Therefore, an amount of calculation necessary for the motion prediction can be reduced, the higher speed operation can be achieved, and also the degradation of the picture quality can be reduced.

Sixth, a spatial resolution transforming means for transforming a spatial resolution against an output of the moving picture decoding portion is provided, and the motion prediction controlling portion includes an motion information resolution transforming means for transforming the motion information in the motion information memory in answer to the resolution. Therefore, an amount of calculation necessary for the motion prediction can be reduced, the higher speed operation can be achieved, and also the degradation of the picture quality can be reduced.

Seventh, the motion prediction controlling portion includes a motion prediction interrupting means for interrupting execution of the adaptive motion predicting means in the moving picture coding portion and then outputting a best motion vector calculated until now as a prediction result. Therefore, the moving picture with less degradation of the picture quality can be achieved in a limited processing time or by a limited amount of calculation.

BRIEF DESCRIPTION OF THE DRAWINGS

FIG. 12 is a view showing the motion information at positions necessary for the time-based synthesis of the motion information in unit of pixel.

DETAILED DESCRIPTION OF THE PREFERRED EMBODIMENTS

Embodiments of the present invention will be explained with reference to the accompanying drawings hereinafter.

(First Embodiment)

Figure 1:
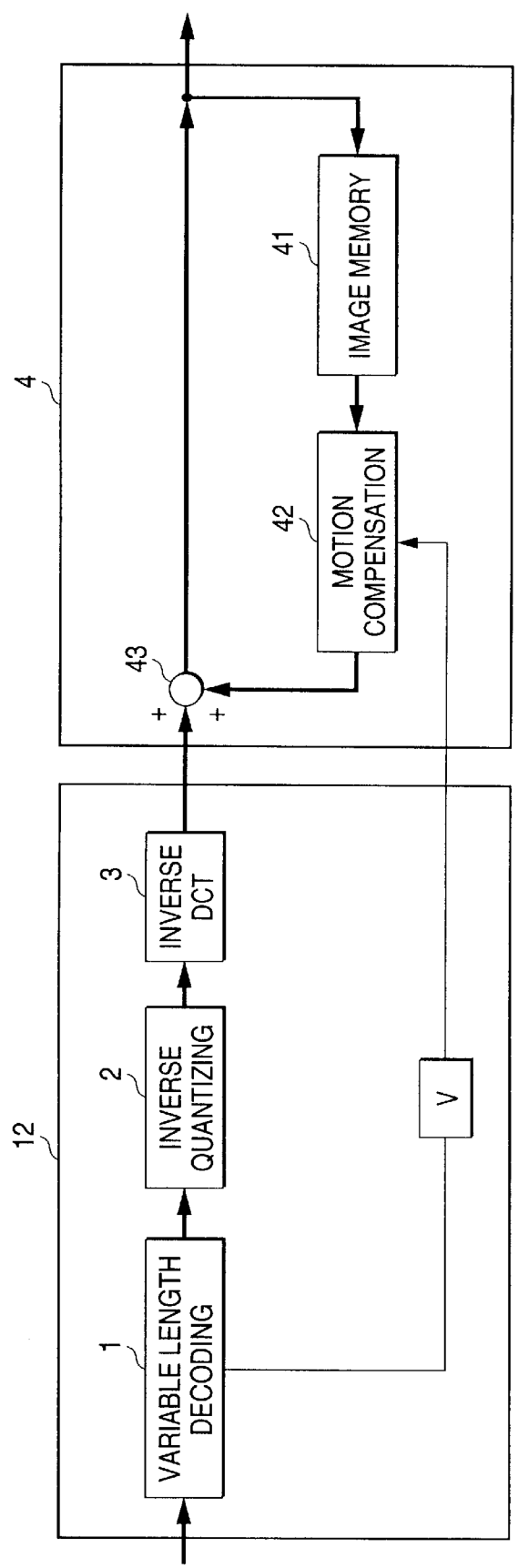
FIG. 1 is a view showing a conventional configuration of a decoder which is compatible with the MPEG standard.
Figure 2:
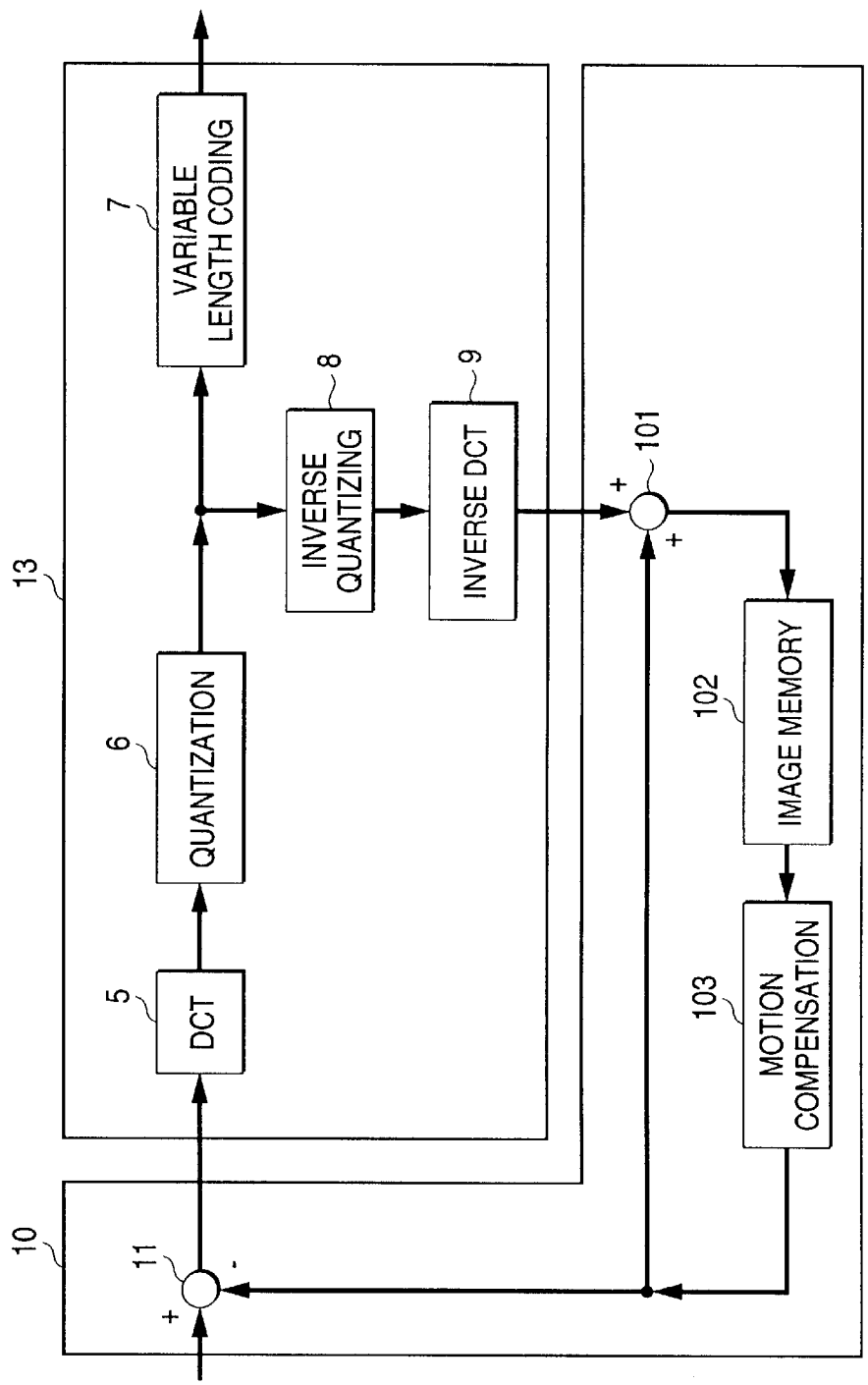
FIG. 2 is a view showing a conventional configuration of an encoder which is compatible with the MPEG standard.
Figure 3:
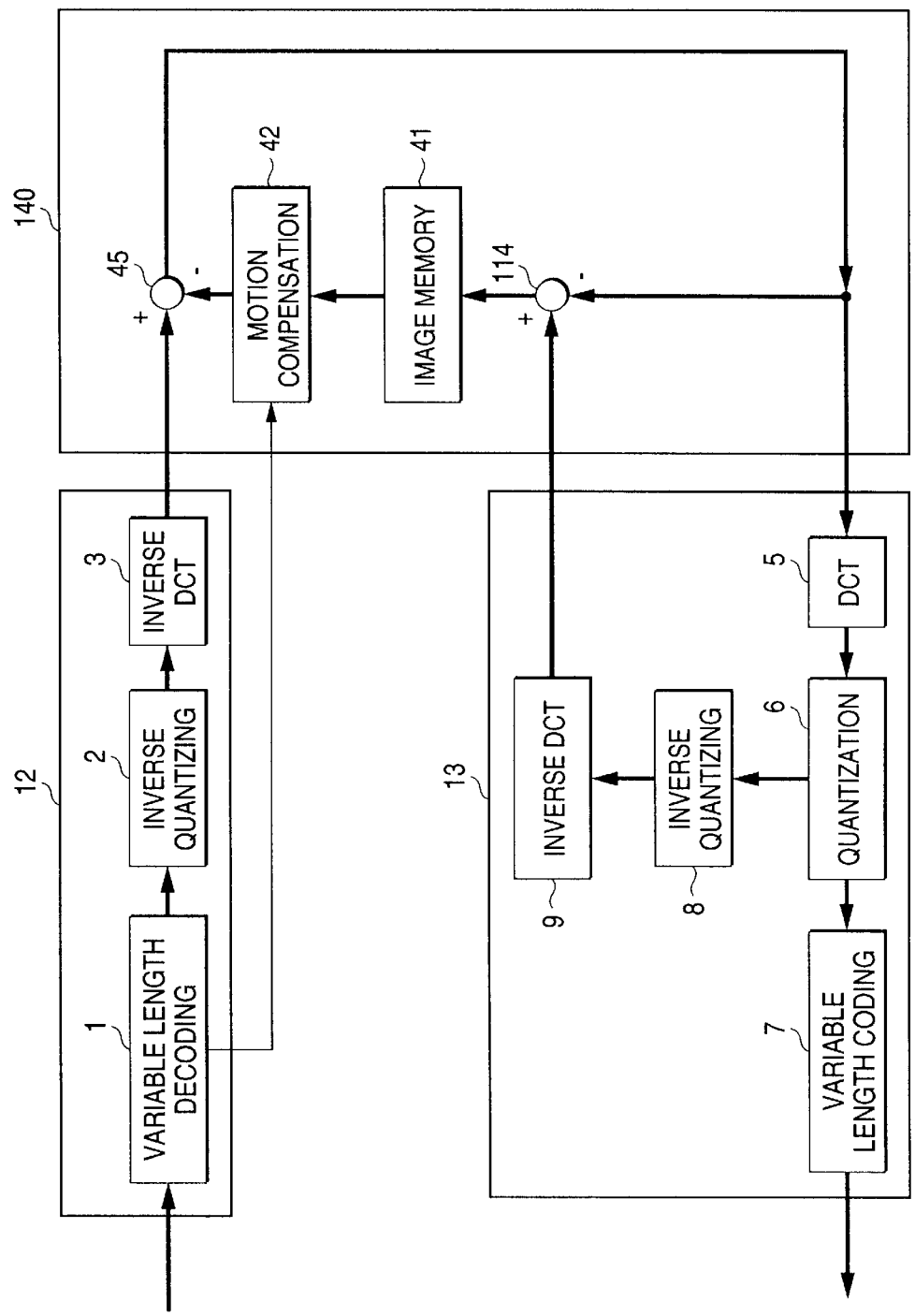
FIG. 3 is a view showing a conventional configuration of a moving picture transforming system in the prior art.
Figure 4:
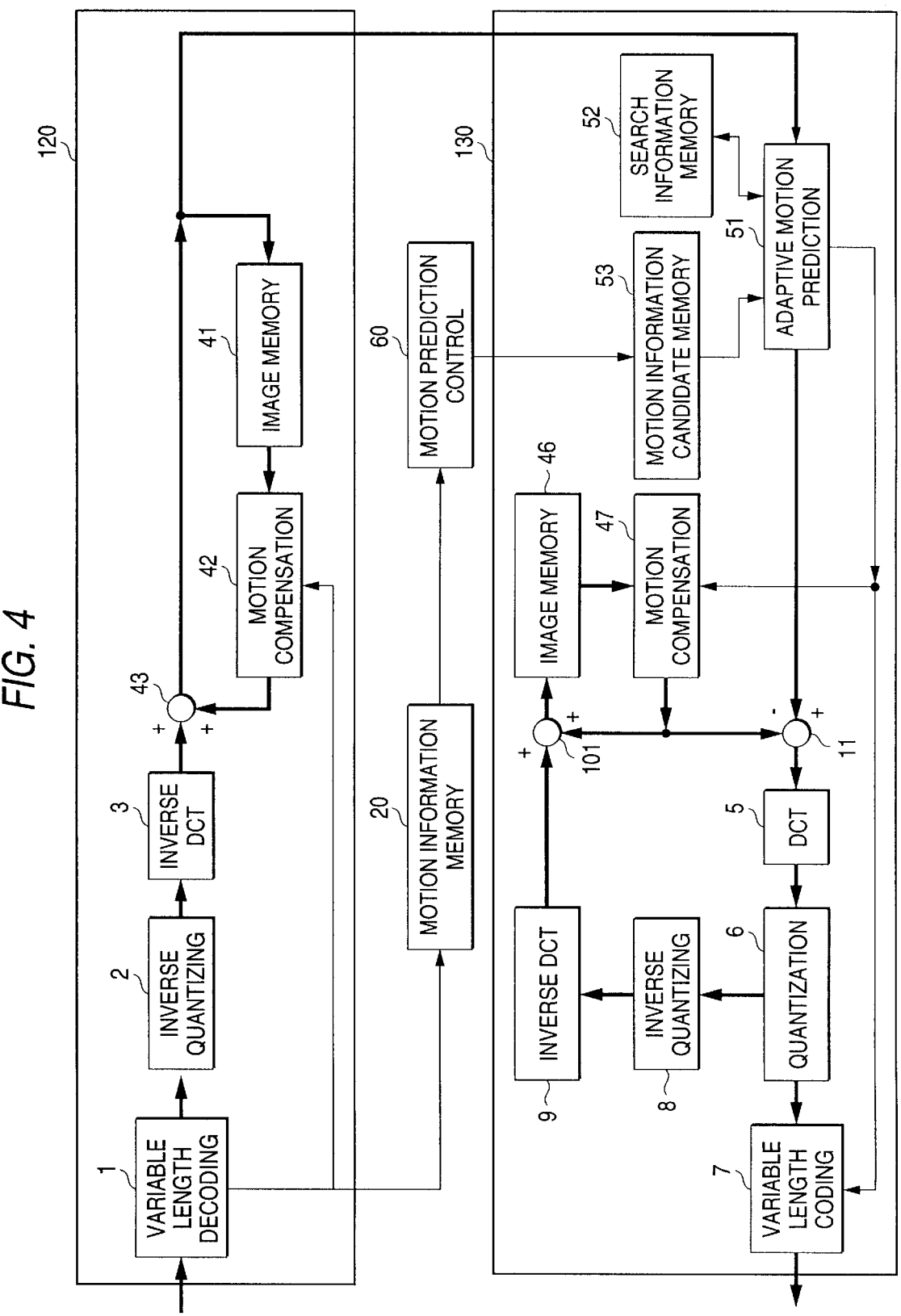
FIG. 4 is a view showing a configuration of a moving picture transforming system according to a first embodiment of the present invention.

FIG. 4 is a view showing a configuration of a moving picture transforming system according to a first embodiment of the present invention.

The present embodiment shows the moving picture transforming system which transforms the H.261 moving picture into the MPEG4 moving picture having the same resolution, e.g., the image resolution in the CIF (Common Intermediate Format: 352×288) format.

In the moving picture decoding portion 120, the variable length decoding means 1 decodes the variable length coding of the H.261 moving picture, and divides a plurality of screens into macro blocks (16×16 size) as an image constituent unit along the time series.

Then, if the image is formed of the macro block (INTER macro block) which consists of the preceding image in the time base and the differential image information, the variable length decoding means 1 outputs the motion information such as the motion vector indicating at which position of the whole screen the difference from the image is located and CBP (Coded Block Pattern) indicating that the difference corresponds to either the whole macro block or the partial constituent element constituting the macro block (unit of a 8×8 size of the brightness and the color difference), and then outputs quantized information to the inverse quantizing means 2 in a macro block unit.

In contrast, if the image information is formed of the macro block (INTRA macro block) which can reproduce the image independently from other macro blocks, the quantized information are output to the inverse quantizing means 2 in the macro block unit as they are.

The inverse quantizing means 2 solves the quantization based on a transformation correspondence table about fixed quantizing steps to then output a DCT coefficient. The output quantization coefficient is converted into image information by the inverse DCT means 3.

In the case of the INTRA macro block, an adder 43 is not operated and thus the image information is stored in the image memory 41 and also output to an MPEG4 coding portion 130.

In the case of the INTER macro block, the motion compensation (i.e., picking-up of the images which are deviated from the reference screen by the motion vector in the macro block unit) is applied to the image information which is stored in the image memory 41 and is preceding on the time base by using the motion information such as the motion vector being extracted by the variable length decoding means 1, and the image information are synthesized by the adder 43 and then output. In contrast, the motion information extracted by the variable length decoding means 1 can be stored in a motion information memory 20 in the macro block unit and then can be read therefrom in the macro block unit as occasion demands.

In case there are motion vectors according to the content of the motion information memory 20, a motion prediction controlling portion 60 stores a reference position indicated by the motion vector into a motion information candidate memory 53 as a motion prediction starting position. In case there is no motion vector, information indicating a default motion search starting position is stored into the motion information candidate memory 53.

In the MPEG4 coding portion 130, in the case of the INTRA macro block output, an adaptive motion predicting means 51 and the subtracting means 11 do not operate and thus the image information are converted into six DCT coefficients by the DCT means 5 every luminance and color difference. The converted DCT coefficients are quantized by a quantizing means 6, and then coded into the MPEG4 format by a variable length coding means 7 as the variable length code to then output. At the same time, the DCT coefficients whose quantization is solved again by the inverse quantizing means 8 are also converted into blocks of the image information consisting of the luminance and the color difference by the inverse DCT means 9 and then stored in an image memory 46.

Meanwhile, in the case of the INTER macro block output, the adaptive motion predicting means 51 executes the motion prediction in compliance with the content of the motion information candidate memory 53 being output from the motion prediction controlling portion 60. In case the content of the motion information candidate memory 53 is default motion search, the motion search is conducted around the current macro block. Here, any one of well-known high-speed motion detecting methods such as the conventional Three Step Search, etc. may be employed as the motion searching method. In contrast, if the search from a particular position is designated in the motion information candidate memory 53, the motion search is conducted around the designated position. Here, Step 2 of the foregoing Three Step Search et seq. may be executed in the search from the designated position, or only the position in the neighborhood of the designated position, which can reduce mostly the differential information, may be searched. Otherwise, other well-known searching method may be executed.

In the event that the original moving picture contains the motion information previously, the motion vector can be calculated at a smaller amount of calculation than the motion search which is performed around the current macro block position. In addition, the motion information candidate memory 53 makes it possible to store the search conducted from a plurality of particular positions and the search conducted from default positions in combination. The adaptive motion predicting means 51 has the search information memory 52 to avoid the overlapped searches. The search information memory 52 stores searched positions of the adaptive motion predicting means 51, and the initialization, etc. thereof can be carried out by a motion prediction controlling portion 60.

In accordance with the result of the adaptive motion predicting means 51, the differential image between the image information output by the H.261 decoding portion 120 and the image which is obtained by applying the motion compensation to the image stored in the image memory 46 by a motion compensating means 47 is generated. Then, like the INTRA macro block, the image is processed by the DCT means 5 and the quantizing means 6 and then the processed image as well as the motion information is coded by the variable length coding means 7 and output therefrom.

(Second Embodiment)

Figure 5:
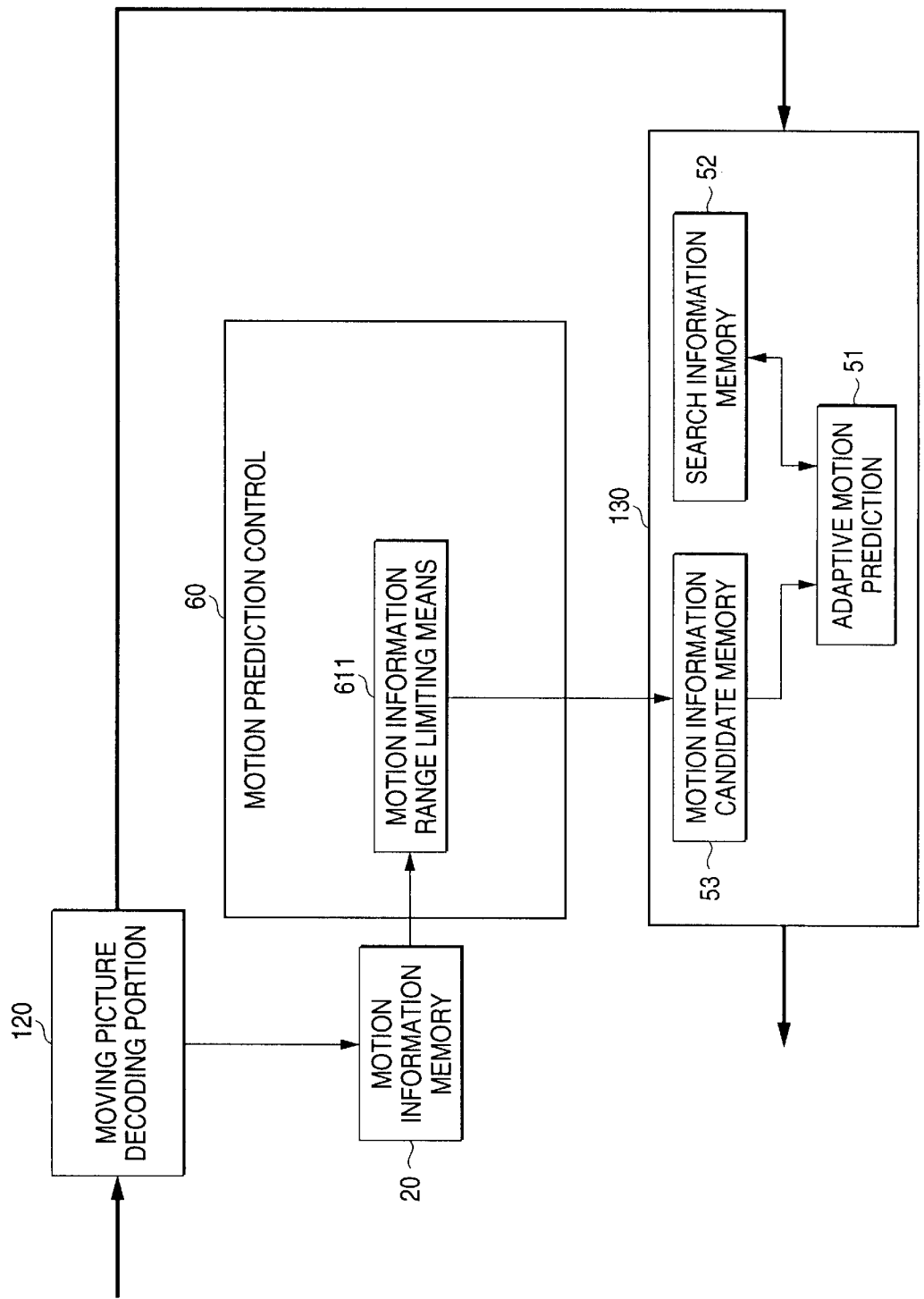
FIG. 5 is a view showing a configuration of a moving picture transforming system according to a second embodiment of the present invention.

FIG. 5 is a view showing a configuration of a moving picture transforming system according to a second embodiment of the present invention.

The present system is the moving picture transforming system which transforms the MPEG1 moving picture into the H.261 moving picture having the same resolution.

The MPEG1 moving picture and the H.261 moving picture have naturally their different applications. The MPEG1 is the standard which is established to be used in the Video CD, for example, in which the moving picture is reproduced by decoding the images being coded and accumulated in non-real time, and has the wide search range of the motion vector. In contrast, the H.261 is the standard which is established to be used in the communication application such as the TV phone, for example, in which the images are coded, transmitted, and decoded in real time. Therefore, the search range which has the great influence upon an amount of calculation is set narrower than the MPEG1. In other words, the motion vectors which are accepted by the MPEG1 are below the standard of the H.261, and thus such motion vectors cannot be directly utilized in the H.261. In the present system, because a motion information range limiting means 611 is provided in the motion prediction controlling portion 60, a position at which the motion vector crosses the search range can be output to the motion information candidate memory 53 as the new motion information if the motion vector, after transformation, is out of the range of the coding standard. There is no guarantee that the differential information can be reduced to the lowest minimum in all cases. But it is effective to refer to only the direction of the motion vector if motion vector does not largely exceed the search range or if the image contains a feature. As a result, increase in an amount of calculation necessary for the motion prediction can be suppressed, and the degradation of the picture quality caused by the quantizing step value change to transform the INTER macro block into the INTRA macro block can be prevented.

(Third Embodiment)

Figure 6:
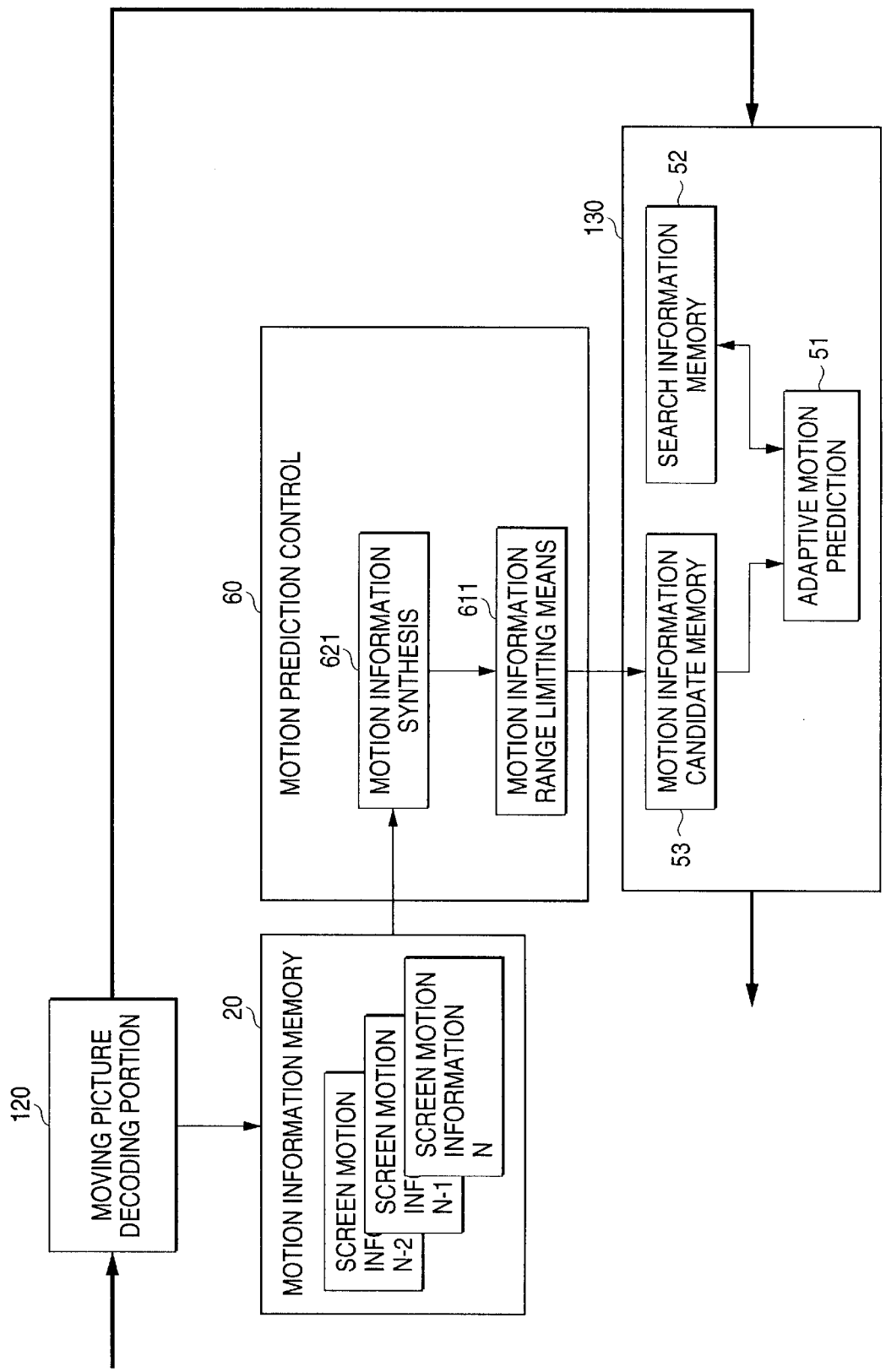
FIG. 6 is a view showing a configuration of a moving picture transforming system according to a third embodiment of the present invention.

FIG. 6 is a view showing a configuration of a moving picture transforming system according to a third embodiment of the present invention.

The present system is the moving picture transforming system which transforms the H.261 moving picture into the MPEG4 moving picture having the same resolution by thinning out the frame. Since the H.261 moving picture decoding portion 120 and the MPEG4 moving picture coding portion 130 have the same configuration and operation as those in the first embodiment respectively, their redundant explanation will be omitted hereunder.

The frame thinning means to transform the video of 30 frames per second into the video of 15 frames per second, for example.

When the frame thinning is performed, basically the motion information in each frame contains the differential information from the preceding video on the time base (there is the case where the differential information from the succeeding video on the time base is contained according to the compressing scheme, but its explanation will be omitted because such case does not occur in the H.261). Therefore, when the frame is thinned out, the subsequent frames which need to refer to the thinned-out INTRA macro block cannot be reproduced in some cases.

Figure 11:
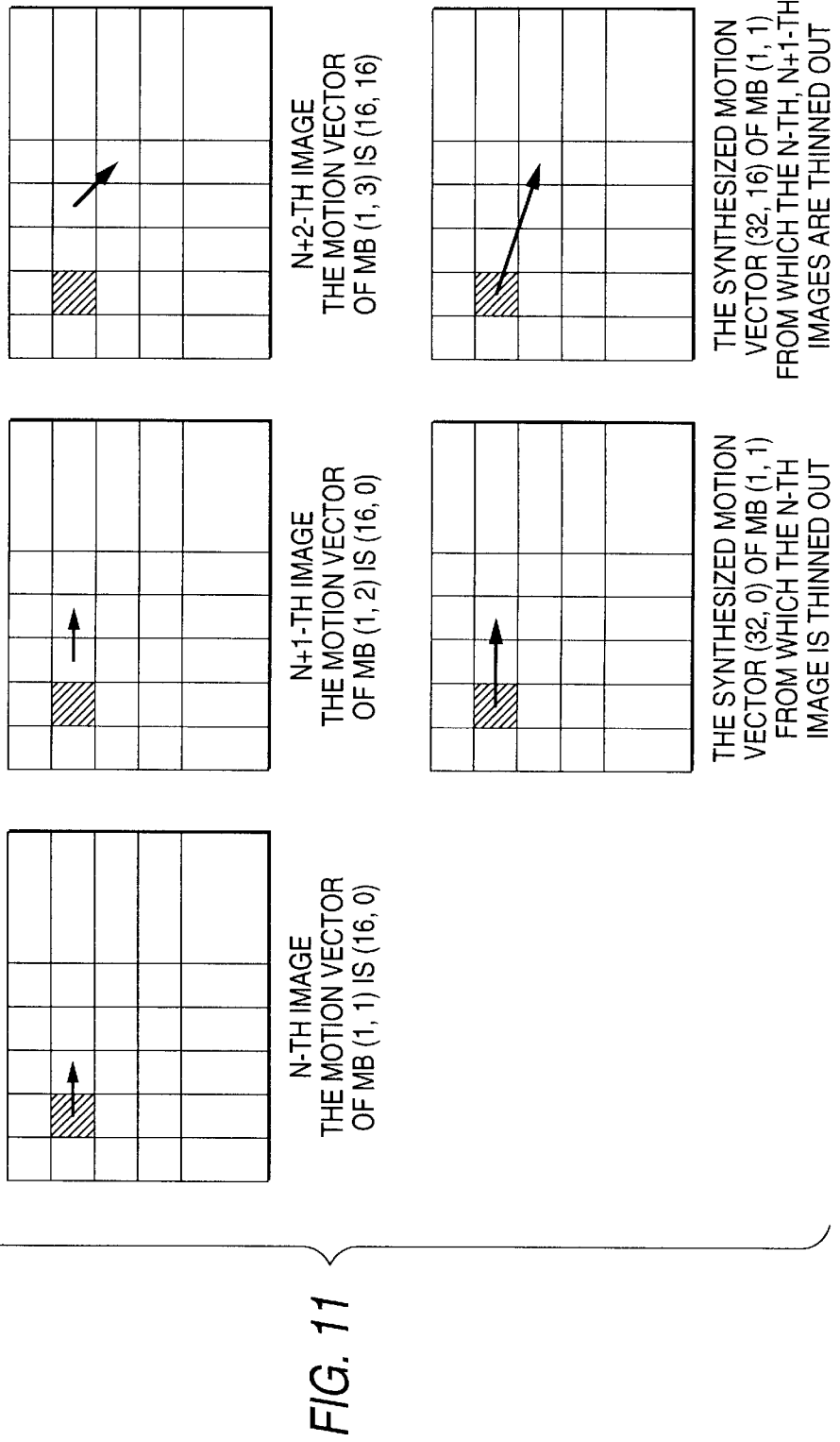
FIG. 11 is a view showing time-based synthesis of motion information.

Here, in the present system, the motion information memory 20 is incorporated for a plurality of frames to store the motion information for the thinned-out frames. The motion prediction controlling portion 60 includes a motion information synthesizing means 621. As shown in FIG. 11, the motion information between the preceding and succeeding frames which are thinned out can be generated by performing the synthesis in the time-base direction.

Then, an operation of the motion information constituting means will be explained with reference to FIG. 11 and FIG. 12 hereunder. The motion information memory records the motion information every macro block, and contains the motion information for a plurality of frames. In the event that the motion vector of a certain macro block MB (1,1) of the N-th image is (16,0) and the motion vector of the MB(1,2) of the N+1-th image is (16,0), the synthesized motion vector from the N−1-th image to the N+1-th image becomes (32,0) when the N-th image is thinned out. Similarly, if the motion vector of the MB(1,3) of the N+2-th image is (16,16), the synthesized motion vector from the N−1-th image to the N+2-th image can be calculated as (32,16) when the N-th and N+1-th images are thinned out.

The magnitude of the motion vector is given by the magnitude of the macro block unit by way of explanation in FIG. 11. However, actually the motion vector can be given by a pixel unit (sometimes, half of the pixel unit). In this case, a concept of the vector in the pixel unit is needed in synthesis. FIG. 12 shows a method of deriving the motion vector in the pixel unit from the motion vector in the macro block unit. In FG. 12, the motion vector at the pixel position (4,5) in the MB (0,0) is calculated by using four motion vectors of MB(0,0), MB(1,0), MB(0,1), MB(1,1). First, an area which has the detected pixel position as a center and has the same size as the macro block is decided, then sizes of sub-areas which occupy respective macro blocks are multiplied by respective components of the vector, and then the total sum is divided by the size of the area, whereby respective components can be detected.

According to the synthesis of the motion information as described above, the motion information can be utilized even if the frame thinning is applied, so that an amount of calculation necessary for the motion prediction can be reduced.

(Fourth Embodiment)

Figure 7:
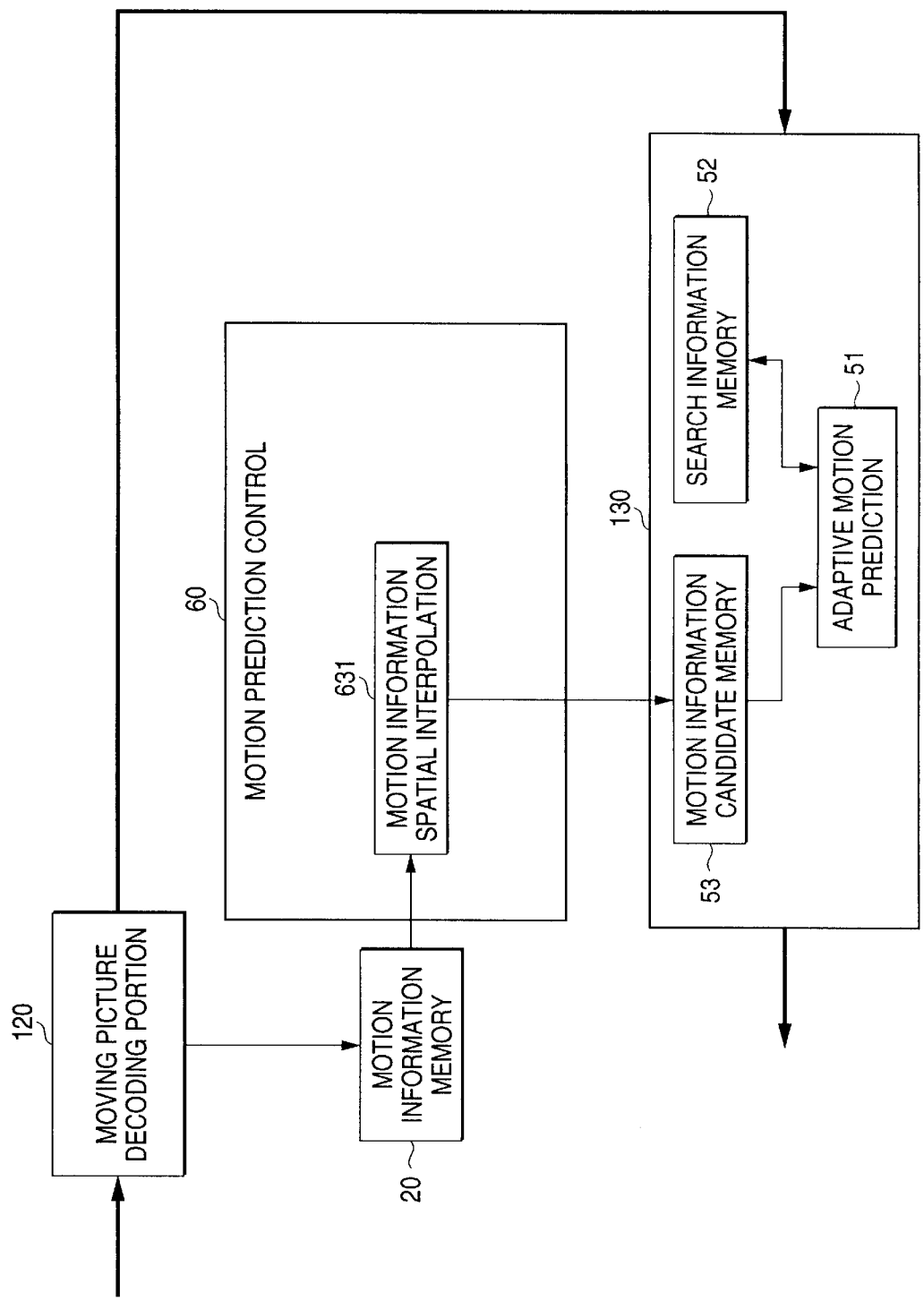
FIG. 7 is a view showing a configuration of a moving picture transforming system according to a fourth embodiment of the present invention.

FIG. 7 is a view showing a configuration of a moving picture transforming system according to a fourth embodiment of the present invention.

The present system is the moving picture transforming system which transforms the H.261 moving picture into the MPEG4 moving picture having the same resolution.

The standard is defined in the H.261 moving picture such that the INTRA macro block must be contained in respective macro block positions at a certain constant interval. When the H.261 moving picture is transformed into the MPEG4 moving picture, it is not always needed to constitute the INTRA macro block like the H.261. If the compression rate must be lowered, sometimes it is needed to transform the INTRA macro block into the INTER macro block. In this case, if there is no scene change because the original video is large and also the overall screen is not constituted of the INTRA macro block, the motion vector of the concerned macro block can be interpolated based on the motion vectors of the neighboring macro blocks which are stored in the motion information memory 20. Since a motion information spatial interpolating means 631 is provided in the motion prediction controlling portion 60, the present system can reduce an amount of calculation necessary for the motion prediction by outputting the interpolated motion information to the motion information candidate memory 53 when the MPEG coding portion 130 generates the INTER macro block from the INTRA macro block. As the interpolation system, the already known interpolation system may be employed solely, or the motion information may be output to the motion information candidate memory 53 by employing a plurality of interpolation systems.

(Fifth Embodiment)

Figure 8:
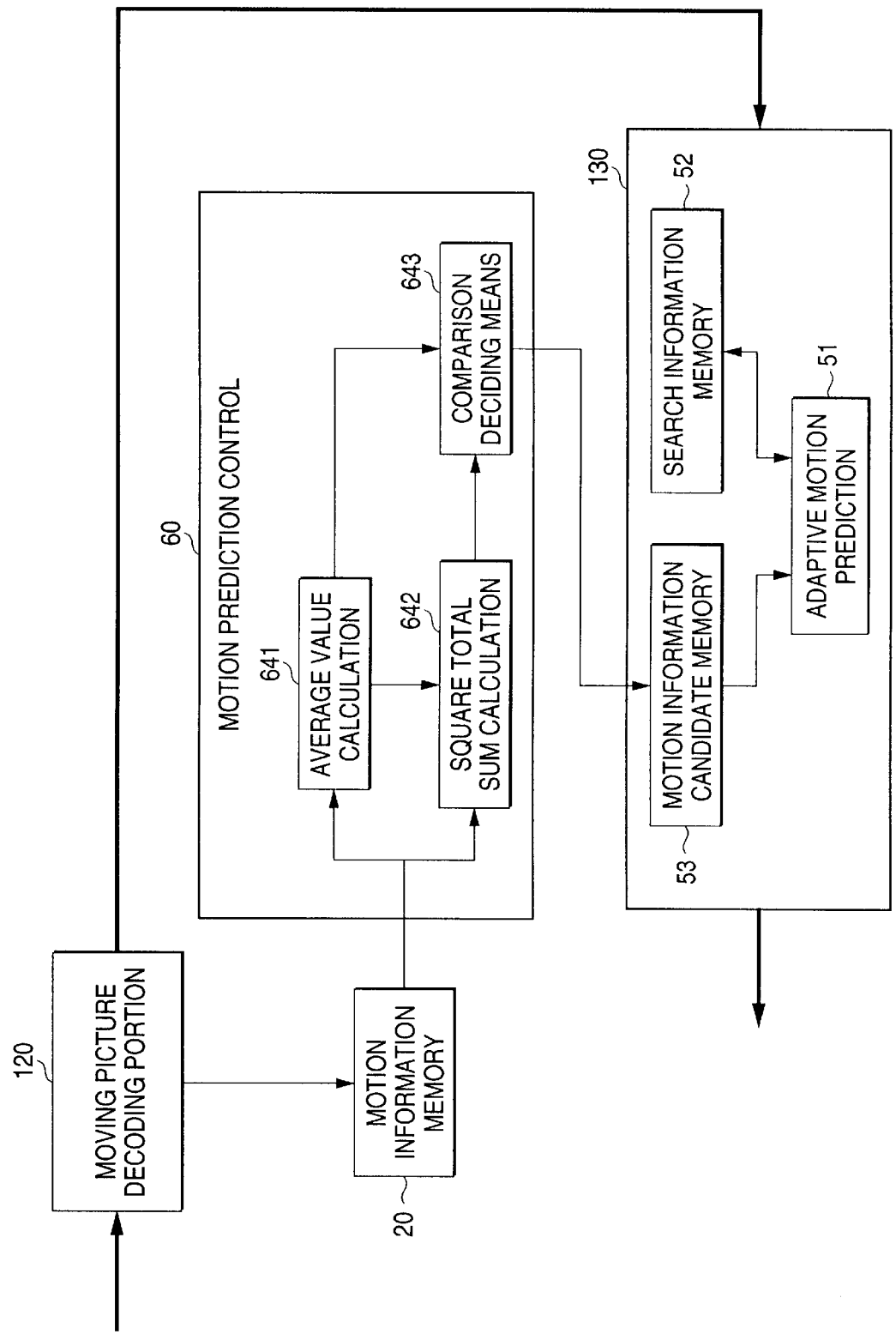
FIG. 8 is a view showing a configuration of a moving picture transforming system according to a fifth embodiment of the present invention.

FIG. 8 is a view showing a configuration of a moving picture transforming system according to a fifth embodiment of the present invention.

The present system is the moving picture transforming system which transforms the H.261 moving picture into the MPEG4 moving picture having the same resolution.

In the situation similar to that in the fourth embodiment, in case the motion which exceeds slightly the search range occurs, or in case the INTRA macro blocks are encoded collectively and thus no motion vector exists in the neighborhood, an average value of the motion vectors on the overall screen can be employed in place of the motion vector.

In this case, the average value of the motion information stored in a motion information memory 20 is calculated by an average value calculation 641, and a square total sum of differences between the average value and respective motion vectors is calculated by a square total sum calculation 642. If this value is less than a predetermined value, it is decided that the similar motion is caused on the overall screen, and then a comparison deciding means 643 loads the average vector on the overall screen into the motion information candidate memory 53 instead of the omitted motion information in a plurality of macro blocks.

(Sixth Embodiment)

Figure 9:
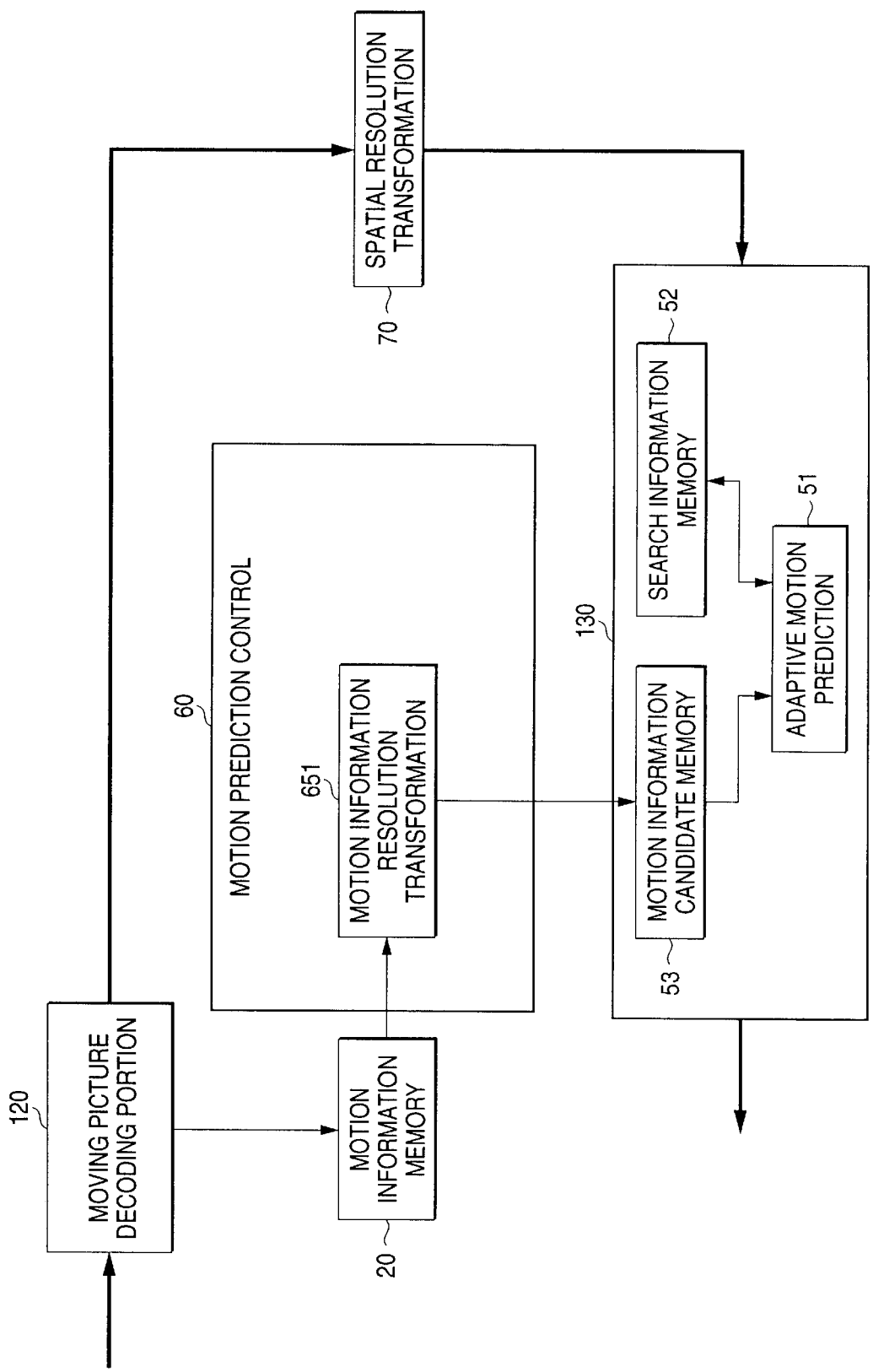
FIG. 9 is a view showing a configuration of a moving picture transforming system according to a sixth embodiment of the present invention.

FIG. 9 is a view showing a configuration of a moving picture transforming system according to a sixth embodiment of the present invention.

The present system is the moving picture transforming system which transforms the H.261 moving picture having the image resolution in the QCIF (Quarter CIF: 176×144) format into the MPEG4 moving picture having the CIF resolution.

If the resolution is different, a spatial resolution transforming means 70 is provided in addition to the first embodiment. In the sixth embodiment, the spatial resolution transformation 70 has twice extension transformation in the longitudinal and lateral directions. But either 1/2 contraction transformation of the resolution may be employed in the longitudinal and lateral directions, or any extraction/ contraction may be employed. Also, interpolation of the image, etc. may be executed simultaneously in the extraction/contraction transformation.

Since the motion information cannot be used as they are if the resolution is different, a motion information resolution transforming means 651 is provided in a motion prediction control 60. The transforming means 651 transforms the motion vectors to mate with a ratio of the decoding resolution and the coding resolution. If the motion vector is enlarged simply, in some cases the motion vector exceeds the motion search range. Therefore, the motion vectors which are not contained in the search range are coded simply as the INTRA macro block by reusing the motion vectors contained in the search range by virtue of the adaptive motion predicting means of the present invention, so that the normal motion prediction can be performed not to cause the quantization degradation. Thus, the higher speed of the motion prediction and the reduction in the degradation of the picture quality can be achieved.

(Seventh Embodiment)

Figure 10:
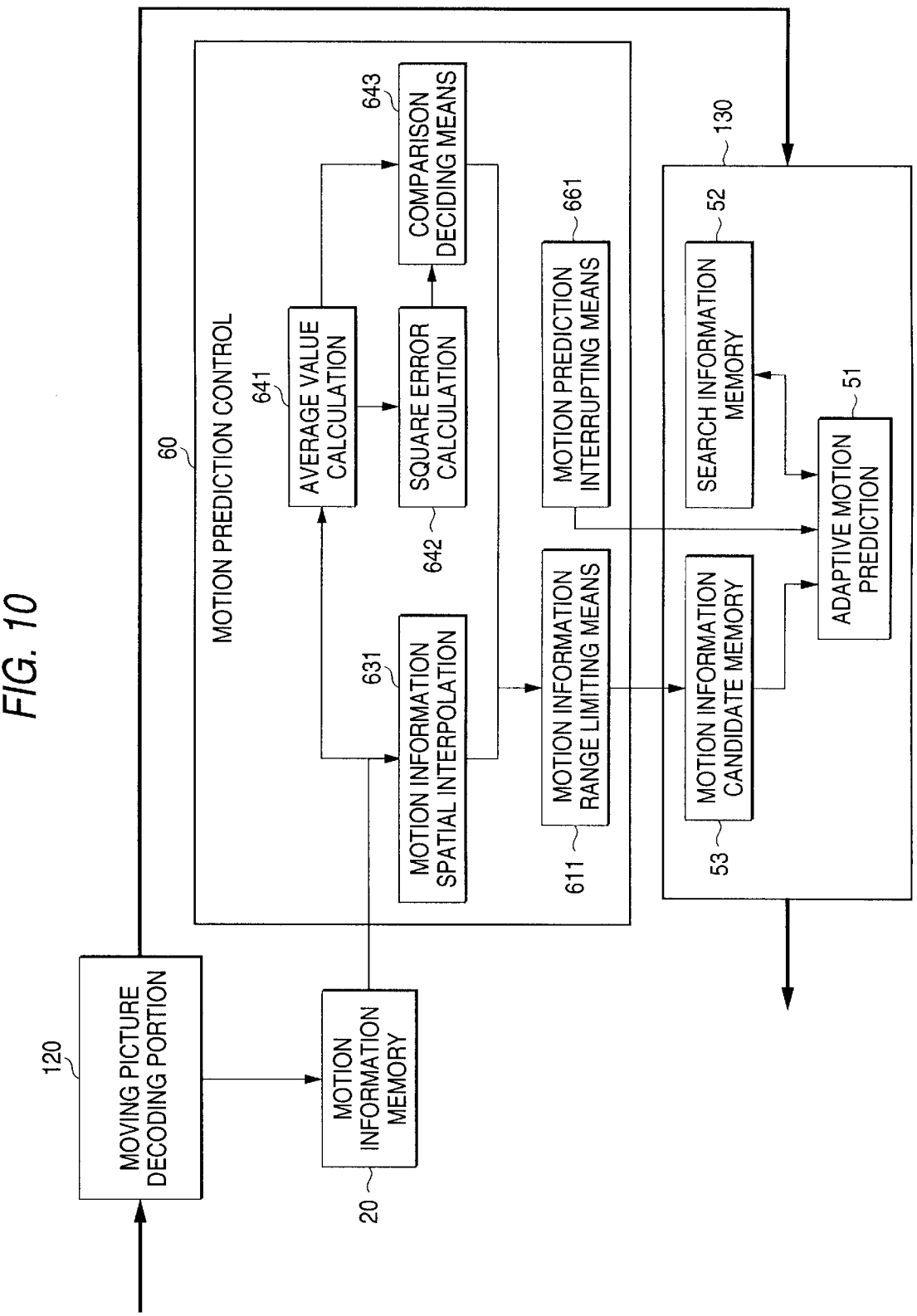
FIG. 10 is a view showing a configuration of a moving picture transforming system according to a seventh embodiment of the present invention.

FIG. 10 is a view showing a configuration of a moving picture transforming system according to a seventh embodiment of the present invention.

The present system is the moving picture transforming system which transforms the H.261 moving picture into the MPEG4 moving picture having the same resolution.

If there are the motion vectors, the loading into the motion information candidate memory 53 is performed by a motion prediction controlling portion 60. Then, if there is no motion vector, first of all an output of a motion information spatial interpolation 631 is loaded into the motion information candidate memory. In turn, an average value of the motion vectors on the overall screen is loaded into the motion information candidate memory 53 via an average value calculating means 641, a square error calculating means 642, and a comparison deciding means 643. In this manner, the motion information are stored in sequence from the motion information with a higher likelihood ratio into the motion information candidate memory 53, then the motion information are searched from the motion information with a higher likelihood ratio by operating the adaptive motion predicting means 51, and then the search is interrupted by a motion search interrupting means 661 in the middle of calculation after a predetermined time has lapsed or a predetermined amount of calculation has been consumed. As a result, it is possible to detect the motion vectors with higher precision within a limited processing time such as a real-time processing. As a method of achieving the motion prediction interrupting means, there are an implementing method using a timer interruption process based on a time, an implementing method of interrupting the search based on the number of times of search stored in the search information memory 52, etc.

As described above, the moving picture transforming system according to the present invention has such advantages that reduction in an amount of calculation which is necessary for the better motion vector search to reduce the degradation of the picture quality can be achieved by reusing/ref erring to the motion vectors contained in the original moving picture compressing scheme in the motion prediction of the coding portion and that the transformation into the different moving picture compressing scheme can be achieved with the small degradation of the picture quality at the high speed.

What is claimed is:

1. A moving picture transforming system comprising:
   a moving picture decoding means including:
      a variable length decoding means for receiving coded digital signals of a compressed moving picture and outputting quantized video information and motion information;
      an inverse quantizing means for reversing quantization of the quantized video information output from the variable length decoding means;
      an inverse orthogonal transforming means for inversely orthogonal-transforming an output of the inverse quantizing means;
      a motion compensating means for compensating an image based on the motion information output from the variable length decoding means;
      an image memory for storing a reference image used by the motion compensating means;
   a motion information memory portion for storing the motion information output from the moving picture decoding means;
   a motion prediction controlling portion for outputting a candidate of the motion vector and controlling execution of the motion prediction, based on the motion information accumulated in the motion information memory portion;
   a moving picture coding portion including:
      a motion candidate memory for storing a plurality of outputs of the motion prediction controlling portion in sequence;
      a search information memory for storing searched information to avoid overlapping caused by searching a plurality of search candidates;
      an adaptive motion predicting means for performing the motion prediction of the image output from the moving picture decoding means based on motion candidates accumulated in the motion candidate memory and the searched information accumulated in the search information memory;
      an orthogonal transforming means for orthogonally transforming the image;
      a quantizing means for quantizing the image which is subjected to orthogonal transformation by the orthogonal transforming means;
      a variable length coding means for coding again the image quantized by the quantizing means to output it;
      a second inverse quantizing means for performing an inverse transformation against the quantizing means;
      a second inverse orthogonal transforming means for performing an inverse transformation against the orthogonal transforming means; a second image memory which corresponds to a resolution of the moving picture to be coded; and
      a motion compensating means operated in accordance with the motion information output from the adaptive motion predicting means.

2. A moving picture transforming system according to claim 1, wherein the motion prediction controlling portion includes a motion information range limiting means which writes a position at which the motion vector crosses the search range into the motion candidate memory if the motion vector exceeds the search range when the motion information candidates are loaded into the motion information candidate memory.

3. A moving picture transforming system according to claim 1, wherein the motion information memory has memories for a plurality of images, the motion prediction controlling portion synthesizes the motion information along a time base every image constituting unit having the motion information and outputs it to the motion candidate memory, and a motion information synthesizing means which outputs information indicating that the motion vector is invalid in place of the motion vector to the motion candidate memory if the frame with no motion vector is detected in motion synthesis is provided, whereby the motion vector can be referred to and utilized when one image is coded by thinning the frame from a differential image containing a plurality of successive motion vectors.

4. A moving picture transforming system according to claim 1, wherein the motion prediction controlling portion includes a motion information spatial interpolating means which performs the interpolation by using an average of the motion vectors in neighboring image constituting units as a substitute vector when there is no motion vector in the image constituting unit accumulated in the motion information memory.

5. A moving picture transforming system according to claim 1, wherein the motion prediction controlling portion includes an average value calculating means for calculating an average value of all vectors for one screen, a square total sum calculating means for calculating a total sum of a difference between respective vectors and the average vector, and a comparison deciding means for outputting a square total sum to the motion information candidate memory if the square total sum is less than a predetermined value by comparing an output of the square total sum calculating means with the predetermined value.

6. A moving picture transforming system according to claim 1, wherein a spatial resolution transforming means for transforming a spatial resolution against an output of the moving picture decoding portion is provided, and the motion prediction controlling portion includes an motion information resolution transforming means for transforming the motion information in the motion information memory in answer to the resolution.

7. A moving picture transforming system according to claim 1, wherein the motion prediction controlling portion includes a motion prediction interrupting means for interrupting execution of the adaptive motion predicting means in the moving picture coding portion and then outputting a best motion vector calculated until now as a prediction result.

* * * * *